Dec. 7, 1954  E. A. STEINBOCK ET AL  2,696,022
INVESTMENT MIXER
Filed April 23, 1951  2 Sheets-Sheet 1
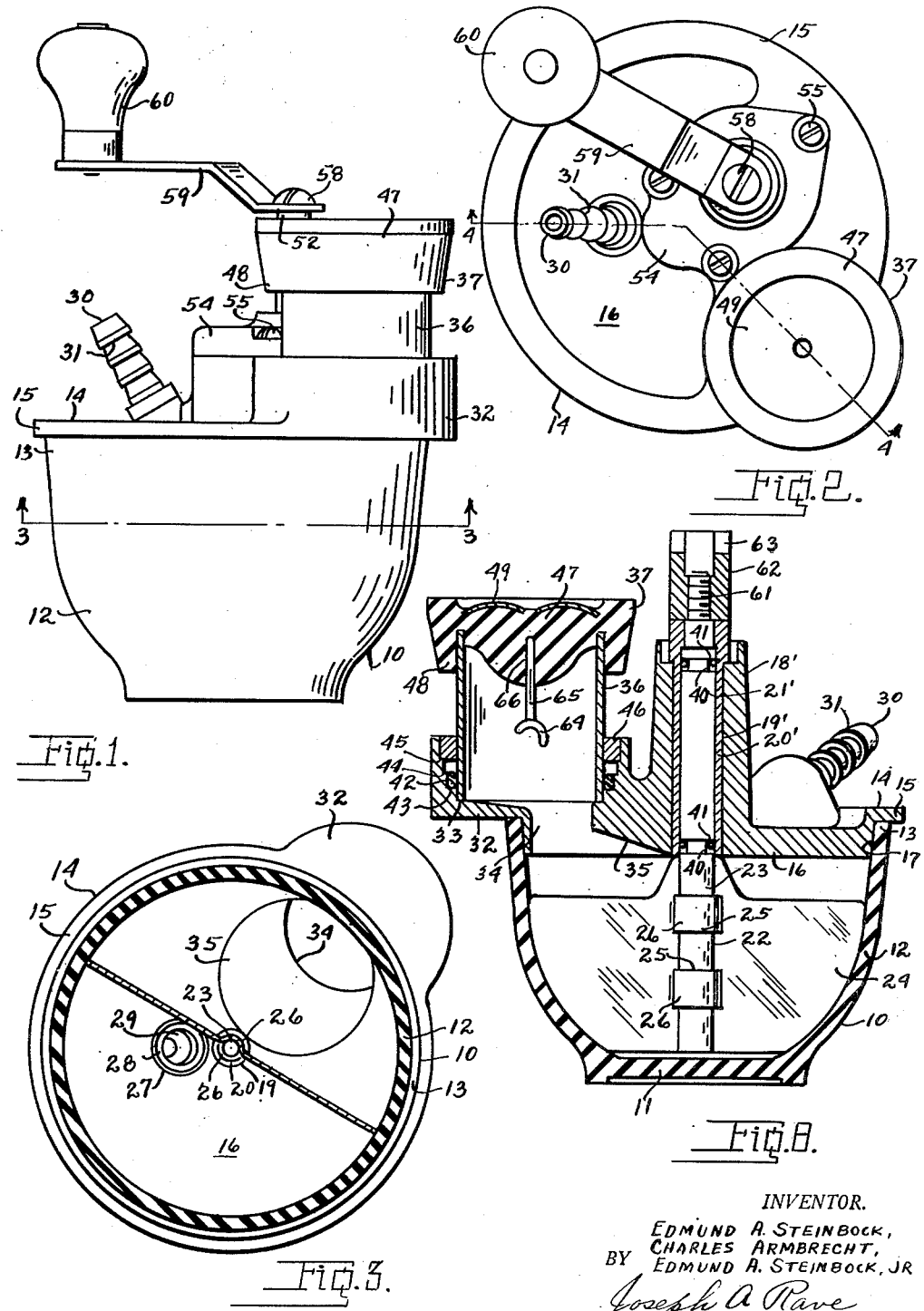
INVENTOR.
EDMUND A. STEINBOCK,
CHARLES ARMBRECHT,
BY EDMUND A. STEINBOCK, JR
Joseph A. Rave
Attorney Dec. 7, 1954 E. A. STEINBOCK ET AL 2,696,022
INVESTMENT MIXER
Filed April 23, 1951 2 Sheets-Sheet 2
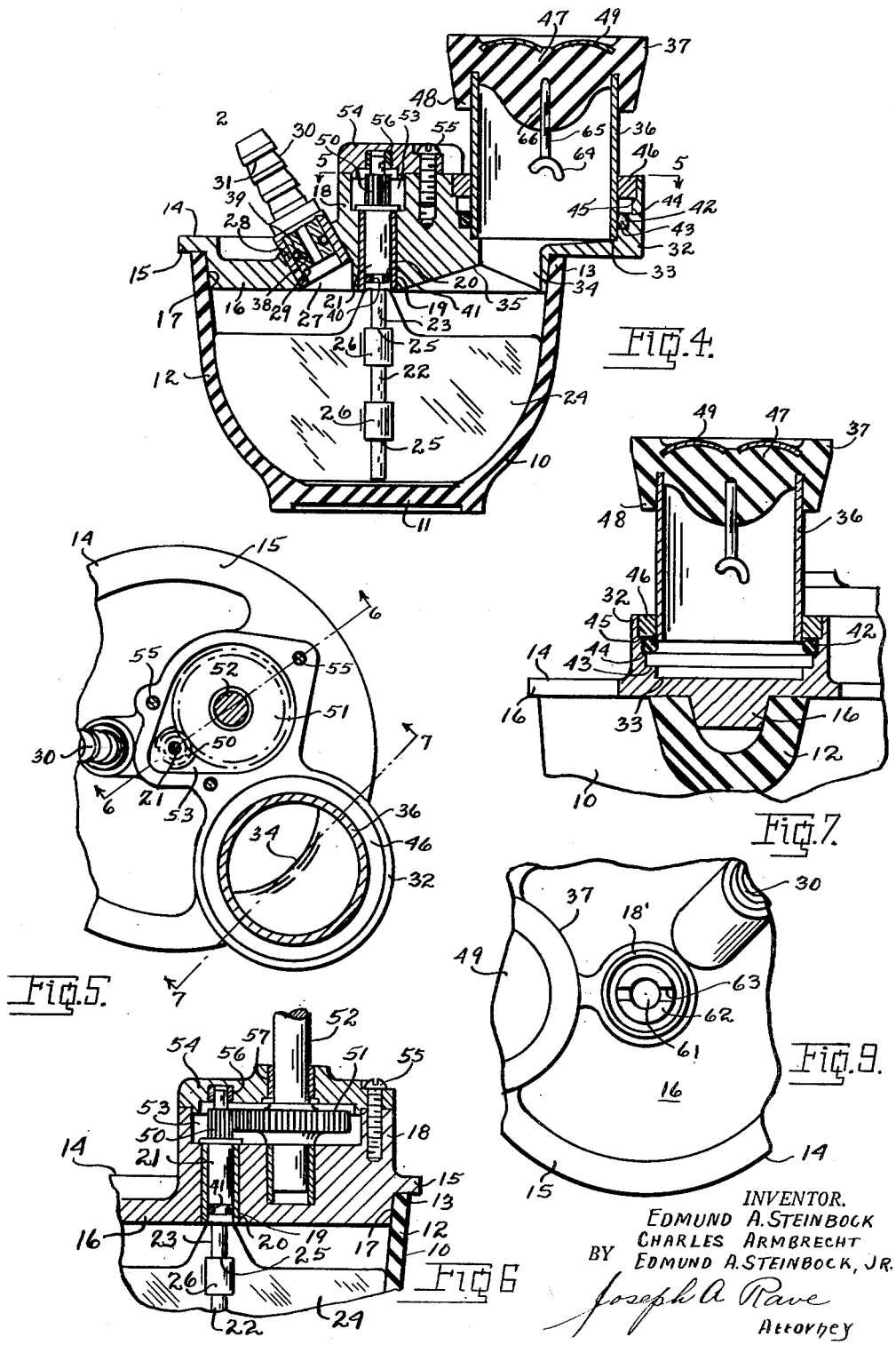
INVENTOR.
EDMUND A. STEINBOCK
CHARLES ARMBRECHT
BY EDMUND A. STEINBOCK, JR.
Joseph A. Rave
Attorney

United States Patent Office 2,696,022
Patented Dec. 7, 1954

2,696,022

INVESTMENT MIXER

Edmund A. Steinbock, Charles Armbrecht, and Edmund A. Steinbock, Jr., Louisville, Ky.; said Armbrecht and said Steinbock, Jr., assignors to said Steinbock Application April 23, 1951, Serial No. 222,372

11 Claims. (Cl. 18—30)

This invention relates to improvements in Investment Mixers and particularly to such a mixer or spatulator in which the mixing or spatulations take place in a vacuum.

This invention relates to improvements in investment mixers over that disclosed in the pending application of Elizabeth A. Luster, Robert Neiman and Edmund A. Steinbock, Jr., Serial No. 200,182, filed December 11, 1950.

The principal object of the present invention is the provision of an investment mixer that is extremely compact and devoid of any extraneous parts for effecting a vacuum chamber in which the ingredients are mixed and from which leakage is prohibited.

A further object of this invention is the provision of an investment mixer in which a vacuum is established during the mixing and in which the parts are reduced to the fewest possible in number.

A further object of this invention is the provision of an investment mixer in which the parts, particularly the casting ring, is provided with a vacuum type seal that is readily established and which seal is easily broken upon the breaking of the vacuum whereby the parts, particularly the casting ring, can be readily and easily separated from one another.

A still further object of the present invention is the provision of an investment mixer in which the parts are readily separated from one another without straining thereby providing a mixer that is convenient in use.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is an elevational view of an investment mixer embodying the principles of the present invention.

Fig. 2 is a top plan view of the mixer mechanism as disclosed in Fig. 1.

Fig. 3 is a horizontal sectional view taken on line 3—3 on Fig. 1 and looking in the direction of the arrows of said line 3—3.

Fig. 4 is a vertical sectional view through the mixer as seen from line 4—4 on Fig. 2.

Fig. 5 is a fragmentary view partly in section and partly in elevation taken on line 5—5 on Fig. 4.

Fig. 6 is a fragmentary sectional view through certain parts of Fig. 5 as seen from line 6—6 on Fig. 5.

Fig. 7 is a fragmentary view partly in section and partly in elevation taken on line 7—7 on Fig. 5.

Fig. 8 is a vertical sectional view similar to Fig. 4 showing a modification in the construction of certain parts.

Fig. 9 is a fragmentary top plan view of certain parts of Fig. 8.

Throughout the several views of the drawings similar reference characters are employed to denote the same or similar parts.

Investment mixers are employed in industry in the mixing of powders and liquid into a flowable plastic for the making of molds which are subsequently destroyed after a cast has been made therein and to recover the casting. Investment mixers are also employed in dental offices and dental laboratories in the formation of molds for the casting of dental restorations. It is in the latter use that the present invention will be particularly employed although the principles involved are equally applicable to the larger commercial use. The main reason for providing a device whereby the materials are mixed in a vacuum is to extract all air from the mixture so that a smooth unbroken mold surface is provided and so that the resulting casting has a smooth surface free of cavities or nodules.

As disclosed in the drawing, use is made of a bowl 10 illustrated as formed of rubber and having a bottom 11 from which the sides 12 outwardly and upwardly flare to an open top bounded by a rim 13. The open top of the bowl 10 is closed by a top or cover 14 generally, a recessed flat disc having a radial flange 15. The body portion 16 of the top or cover 14 depends into the bowl rim 13, with the periphery of the said body portion 16 inwardly and downwardly tapered, as at 17, to have a snug fit with the bowl rim 13. The top or cover 14 has upstanding therefrom, at substantially its center, a boss 18 which, as seen in Fig. 2, has its longitudinal axis outwardly radiating from the top or cover center. The boss 18 is provided at substantially the top or cover center with an aperture 19 in which is pressed a bearing sleeve 20 acting as a journal for the enlarged bearing portion 21 of a driven shaft, indicated in its entirety by the reference numeral 22.

The driven shaft 22 has depending from its bearing portion 21 a reduced portion 23 to which is attached a mixer blade or paddle 24. Any suitable or desirable method or means may be employed for securing the mixer blade or paddle to the driven shaft 23 that is shown consisting of forming transversely of the blade or paddle a plurality of slits 25 between the upper and lower ends thereof and outwardly and oppositely pressing the material on opposite sides of each slit 25 to thereby form semi-circular sleeves 26 extending from the opposite surfaces of the blade or paddle with adjacent semi-circular sleeves together forming a complete sleeve and providing a substantially central passageway through said blade through which the shaft portion 23 passes. The driven shaft 22 passes upwardly of the bearing sleeve 20 for attachment to any suitable or desirable means for effecting its rotation and the rotation of the mixing blade or paddle 24.

The top or cover 14 is provided therethrough, and to one side of the axial center thereof, with a passageway 27 which has its axis preferably, but not necessarily, angularly related to the vertical axis of the bowl 10. Disposed in the passageway 27 is a sleeve 28 receiving one end 29 of a fitting 30 which has its other end outwardly of the sleeve 28 and ridged or stepped as at 31 for the reception of a flexible hose or conduit, not shown. The end 29 of the fitting 30 has a leak-proof joint with the sleeve 28 and the flexible hose or conduit, not shown, has its other end connected with a vacuum pump or motor, likewise not shown.

The cover or top 14 is provided to one side of its axial center with a laterally and upwardly extending boss 32 which extends beyond the rim of the cap or cover flange 15, as shown most clearly in Figs. 2 and 5. The boss 32 is provided with a plurality of concentric counterbores each terminating in a seat with the innermost counterbore terminating in the seat 33 forming the base of the counterbores and through which extends a passageway or bore 34 into the interior of the bowl 10. The said passageway 34 through the body portion 16 of the top or cover 14 simulates an inverted funnel, as at 35, and acts as a funnel for a purpose subsequently to be made clear. Disposed within the counterbores and resting on the counterbores lowermost seat or base 33 is one end of a casting ring or mold forming housing 36. The other end of the casting ring or mold forming housing 36 is closed by a member 37, known in the trade as a crucible former and sprue former carrier.

In operation the ingredients to be mixed, plaster of Paris, or the like, water, accelerators, retarders, and other desirable ingredients, are disposed in the bowl 10 and are then hand spatulated or not, as desired, whereupon the top or cover 14 is placed on the bowl for closing the same. The reason for hand spatulation is to wet down the dry ingredients and prevent withdrawal thereof by the vacuum pump or motor. The casting ring or mold forming housing is then disposed in the boss 32, the said casting ring or mold forming housing having had previously attached thereto the crucible former 37. The fitting 30, with its flexible hose or conduit attached, is then inserted in the sleeve 28 and the vacuum pump or motor operated for drawing air from the interior of the bowl 10 as well as from the interior of the casting ring or mold forming housing 36. The shaft 22 is now rotated for thoroughly mixing the ingredients within the bowl 10. It will be understood that as the mixing blade or paddle 24 is rotated the ingredients are tumbled about, pressed against one another, and otherwise thoroughly intermixed with one another thereby releasing or liberating any air that may have been introduced into the bowl with the ingredients, or entrapped by the ingredients, and that all such liberated air is drawn off by the vacuum pump or motor.

In order that there be no leakage or communication with the atmosphere, each of the openings through the top or cover 14 is provided with a seal which may take any suitable or desirable form, preferably that shown in the drawings. As illustrated in Fig. 4 the leak-proof joint of the reduced end 29 of the vacuum hose fitting 30 is accomplished by providing the said fitting reduced end 29, intermediate its ends, with a circumferential groove 38 in which is disposed a gasket 39, known in the trade as an O ring. An O ring is, as its name implies, a circle of compressible material, preferably rubber, and preferably having a circular transverse cross-section, which when mounted in the groove 38 has its outer edge projecting sufficiently beyond the outer surface of the fitting that when inserted in the sleeve 28 the O ring is transversely compressed thereby providing a leak-proof joint between the fitting reduced end 29 and sleeve 28.

The mixing paddle or blade shaft 22 is similarly sealed and for which purpose the bearing portion 21 is provided intermediate its ends with a circumferential groove 40 for a gasket or O ring 41 which bears the same relation to the said shaft bearing portion 21 and its journal or bearing sleeve 19 as above set forth with respect to the O ring 39 for thereby effecting a leakproof seal around the said shaft bearing.

The casting ring or mold forming housing 36 is likewise sealed by an O ring, but since the casting ring or mold forming housing 36 is of considerably greater size than the fitting 30 or shaft bearing 21, and since the casting ring or mold forming housing must be inserted and removed from its counterbore, the force necessary in compressing the O ring 42 rendered it difficult to follow the same procedure as above set forth in connection with the O rings 39 and 41. As disclosed in Fig. 4, and as noted above, the boss 32 is provided with a plurality of concentric counterbores each of which terminates in a seat which may be designated as a lower intermediate seat 43, and upper intermediate seat 44, and an uppermost seat 45. Disposed within the counterbore and on the upper intermediate seat 44 is the O ring 42. The casting ring or mold forming housing 36 is initially brought into engagement with the O ring 42, as shown in Fig. 7, with no appreciable effort made to push the casting ring into the O ring and as the vacuum within the bowl 10 is established the said vacuum draws the casting ring to its seat 33 thereby forcing the ring 36 through the O ring 42 and at the same time rolling the O ring down onto the lower intermediate counterbore seat 43 and at the same time compressing the O ring 42, as clearly illustrated in Fig. 4, between the outer surface of the casting ring and the surface of the counterbore. The counterbores of the boss 32 are closed by a guide ring 46 disposed on the counterbores uppermost seat 45, the guide ring 46 acts as a guide for the casting ring 36 when initially placed against the O ring gasket 42 and at the same time prevents the disassociation of the O ring 42 from the boss 32 as will presently be made clear.

In the past the crucible former and sprue former carrier 37 were cast of rubber, as the said part of the present invention is formed, but the vacuum within the bowl 10 and casting ring or mold forming housing 36 had a tendency to inwardly draw the body portion 47 thereby causing the pulling away of the lip 48 of the crucible former from the casting ring and permitting communication with the atmosphere. As disclosed in Fig. 4 the said crucible former 37 has imbedded in its outer end a metal plate 49 which resists any flexing in the crucible former and thereby prevents the lip 48 from being outwardly flexed from the casting ring.

The bowl 10 and casting ring 36 now being air tight the shaft 22 is rotated by any suitable or desirable means, manual or power.

As disclosed in Figs. 1, 4 and 6, one means for rotating the shaft 22 consists in forming integrally with the said shaft 22 above the bearing portion 21 a pinion 50 meshing with a gear 51 integral with or secured to a driving shaft 52. The pinion 50 and gear 51 are disposed in a recess 53 formed downwardly of the upper surface of the housing boss 18. The recess 53 is closed by a cap 54 secured to the boss 18 by suitable cap screws 55. The cap 54 is provided with bearing sleeves 56 and 57, respectively, for the driven mixer blade or paddle shaft 22 and the driving shaft 52. The shaft 52 projects upwardly through the cap 54 to have its upper end above the casting ring 36 and crucible former 37, and to which projecting end is secured, by a screw 58, one end of a lever or crank 59. The other end of crank or lever 59 is provided with an actuating knob or handle 60.

The actuating mechanism just described provides a manual means for rotating the shaft 22 and the mixing blade or paddle 24 secured thereto. As shown in Figs. 8 and 9 a power means may be provided for this purpose, which consists in modifying the shaft 22 to the extent of elongating its bearing 21' so that it projects through and above a bearing sleeve 20' that is disposed in and extends through an elongated cylindrical boss 18' upstanding from the top or cover 14. The sleeve 20' has the end of the shaft 21' projecting thereabove as a threaded stud 61 to which is threaded a driving member 62 provided with a transverse slot 63 for receiving a driving key from a motor driven shaft, not shown, but well known in the art for rotating investment mixer paddles or blades.

After the ingredients have been sufficiently intermixed the bowl 10 and parts carried thereby, while the vacuum pump or motor is in operation, is turned in a clockwise direction, as seen in Fig. 4, onto a vibrator, not shown, and with the crucible former 37 resting on the plate of the said vibrator. The mixed ingredients, now in a flowable plastic state, are, by the action of the vibrator, brought to the funnel 35 which directs the same to and through the passage 34 into thhe casting ring or mold forming housing 36 to encase the pattern 64 and sprue former 65 extending from the said pattern and carried by a socket 66 in the crucible former and sprue former carrier 37. The bowl is turned in a clockwise direction to a point not quite vertical so that the mixed ingredients will flow to the said funnel 35 rather than be disposed on the under side of the top or cover 14 as would be the case if a complete inversion of the bowl from the position of Fig. 4 were made.

After the casting ring or mold forming housing 36 has been filled the vacuum pump or motor is stopped and the fitting 30 removed from the sleeve 28 thereby breaking the vacuum within the bowl 10. The casting ring or mold forming housing 36 is now axially withdrawn from the boss 32. The connection of the O ring 42 is such that the casting ring or mold forming housing 36 is readily withdrawn and in so doing rolls the O ring 42 from its position on the counterbore lower intermediate seat 43 of Fig. 4 to its position on the upper intermediate seat 44 of Fig. 7 whereupon the compression in the O ring 42 is reduced to substantially zero allowing the ready separation of the parts.

From the foregoing it will be noted that where has been provided an investment mixer for operation in a vacuum in which the parts are reduced to an absolute minimum and in which the parts are all carried by a single member which acts as a cover for the bowl and a support for the casting ring or mold forming housing and which parts are held to one another as a compact unit during operation and whereby through a simple twist of the wrist the mixed mold forming ingredients are transferred to the mold forming housing or casting ring.

What is claimed is:

1. In a device of the class described the combination of a mixing bowl, a cover for the bowl, a mixing paddle within the bowl, means connected with the mixing paddle carried by and driven from the exterior of the cover for rotating the mixing paddle within the bowl, said cover having a discharge opening therethrough, and a removable mold forming housing carried by the cover in operative relation to the cover discharge opening and projecting outwardly of the cover.

2. In a device of the class described the combination of a mixing bowl, a cover for the bowl, a mixing paddle within the bowl, means connected with the mixing paddle carried by and driven from the exterior of the cover for rotating the mixing paddle within the bowl, said cover having a discharge opening therethrough, a removable mold forming housing carried by the cover in operative relation to the cover discharge opening and projecting outwardly of the cover, and means for connecting a vacuum establishing means with the interiors of the bowl and mold forming housing.

3. In a device of the class described the combination of a mixing bowl, a cover detachably connected with the bowl, means within the bowl driven from the exterior of the bowl for mixing ingredients within the bowl, a discharge opening through the cover for discharging the mixed ingredients from the bowl, said discharge opening being located adjacent the rim of the cover but wholly within said cover, means exteriorly of the cover for supporting a mold forming housing in operative relation with the discharge opening through the cover, and a mold forming housing on said cover mold forming housing supporting means.

4. In a device of the class described the combination of a mixing bowl, a cover detachably connected with the bowl, means within the bowl driven from the exterior of the bowl for mixing ingredients within the bowl, a discharge opening through the cover for discharging the mixed ingredients from the bowl, said discharge opening being located adjacent the rim of the cover but wholly within said cover, means exteriorly of the cover for supporting a mold forming housing in operative relation with the discharge opening through the cover, a mold forming housing on said cover mold forming housing supporting means, and means for connecting a vacuum establishing means with the interiors of the bowl and mold forming housing.

5. In a device of the class described the combination of a mixing bowl, a detachable cover for the bowl, a mixing paddle within the bowl, a shaft rotatably supported by the cover to depend within the bowl for attachment to the paddle, means exteriorly of the cover connected with the shaft for rotating the same, said cover having a discharge opening therethrough, means on said cover for supporting a mold forming housing in operative relation to the cover discharge opening, a mold forming housing operatively associated with said supporting means to project outwardly of the cover, said cover having a second opening therethrough, and a fitting removably mounted in said second opening for connecting a vacuum establishing means with the interiors of the bowl and mold forming housing.

6. In a device of the class described the combination of a mixing bowl, a detachable cover for the bowl, a mixing paddle within the bowl, a shaft rotatably supported by the cover to depend within the bowl for attachment to the paddle, means exteriorly of the cover connected with the shaft for rotating the same, said cover having a discharge opening therethrough, means on said cover for supporting a mold forming housing in operative relation to the cover discharge opening, a mold forming housing operatively associated with said supporting means to project outwardly of the cover, said cover having a second opening therethrough, a fitting removably mounted in said second opening for connecting a vacuum establishing means with the interiors of the bowl and mold forming housing, and means associated with each of the said mixing paddle driving shaft, mold forming housing, and vacuum establishing means fitting for providing a leakproof joint between each of said parts and the cover.

7. In a device of the class described the combination of a mixing bowl, a detachable cover for the bowl, a mixing paddle within the bowl, a shaft rotatably supported by the cover to depend within the bowl for attachment to the paddle, means exteriorly of the cover connected with the shaft for rotating the same, said cover having a discharge opening therethrough, means on said cover for supporting a mold forming housing in operative relation to the cover discharge opening, a mold forming housing operatively associated with said supporting means to project outwardly of the cover, said cover having a second opening therethrough, a fitting removably mounted in said second opening for connecting a vacuum establishing means with the interiors of the bowl and mold forming housing, and means associated with each of the said mixing paddle driving shaft, mold forming housing, and vacuum establishing means fitting for providing a leakproof joint between each of said parts and the cover in the form of a ring on each of said parts compressible between the said parts and wall of the cover opening through which they pass.

8. In a device of the class described the combination of a mixing bowl, a cover detachably connected with the bowl, means within the bowl driven from the exterior of the bowl for mixing ingredients within the bowl, a discharge opening through the cover for discharging the mixed ingredients from the bowl, said discharge opening being located adjacent the rim of the cover but wholly within said cover, a counterbored boss upstanding from the cover having the discharge opening through the cover entirely circumscribed thereby and a base at the bottom of the counterbore extending radially of said discharge opening, a mold forming housing having at least one end open disposed in said boss counterbore on said counterbore base and with its open end in communication with the cover discharge opening, a guide ring at the upper end of the counterbore for guiding the mold forming housing to the counterbore base, and means for connecting a vacuum establishing means with the interiors of the mixing bowl and mold forming housing.

9. In a device of the class described the combination of a mixing bowl, a cover detachably connected with the bowl, means within the bowl driven from the exterior of the bowl for mixing ingredients within the bowl, a discharge opening through the cover for discharging the mixed ingredients from the bowl, said discharge opening being located adjacent the rim of the cover but wholly within said cover, a counterbored boss upstanding from the cover having the discharge opening through the cover entirely circumscribed thereby and a base at the bottom of the counterbore extending radially of said discharge opening, a mold forming housing having at least one end open disposed in said boss counterbore on said counterbore base and with its open end in communication with the cover discharge opening, a guide ring at the upper end of the counterbore for guiding the mold forming housing to the counterbore base, a compressible gasket within the counterbore between its base and guide ring compressible by the mold forming housing against the surface of the boss counterbore, and means for connecting a vacuum establishing means with the interiors of the mixing bowl and mold forming housing.

10. In a device of the class described the combination of a mixing bowl, a cover detachably connected with the bowl, means within the bowl driven from the exterior of the bowl for mixing ingredients within the bowl, a discharge opening through the cover for discharging the mixed ingredients from the bowl, said discharge opening being located adjacent the rim of the cover but wholly within said cover, a hollow boss upstanding from said cover having the discharge opening through the cover entirely circumscribed thereby, said hollow boss having a plurality of concentric counterbores to provide within the boss a lowermost seat, a lower intermediate seat, an upper intermediate seat and an uppermost seat, said lowermost seat extending substantially radially of said cover discharge opening, a sealing gasket normally on said upper intermediate seat, a mold forming housing having at least one end open disposed in said boss counterbores on said lowermost seat and with its open end in communication with said cover discharge opening, said mold forming housing compressing the sealing gasket and disposing same on the lower intermediate seat, means on said uppermost counterbores seat for closing the counterbores, and means for connecting a vacuum establishing means with the interiors of the bowl and mold forming housing.

11. In a device of the class described the combination of a mixing bowl, a cover detachably connected with the bowl, means within the bowl driven from the exterior of the bowl for mixing ingredients within the bowl, a discharge opening through the cover for discharging the mixed ingredients from the bowl, said discharge opening being located adjacent the rim of the cover but wholly within said cover, a hollow boss upstanding from said cover having the discharge opening through the cover entirely circumscribed thereby, said hollow boss having a plurality of concentric counterbores to provide within the boss a lowermost seat, a lower intermediate seat, an upper intermediate seat and an uppermost seat, said lowermost seat extending substantially radially of said cover discharge opening, a sealing gasket normally on said upper intermediate seat, a mold forming housing having at least one end open disposed in said boss counterbores on said lowermost seat and with its open end in communication with said cover discharge opening, said mold forming housing compressing the sealing gasket and disposing same on the lower intermediate seat, a guide ring on said uppermost seat guiding the mold forming housing to the gasket and lowermost seat, and means for connecting a vacuum establishing means with the interiors of the bowl and mold forming housing.

References Cited in the file of this patent

UNITED STATES PATENTS

| Number | Name | Date |
|---|---|---|
| 275,332 | Depew | Apr. 3, 1883 |
| 747,061 | Gilbert | Dec. 15, 1903 |
| 946,677 | Lederle | Jan. 18, 1910 |
| 1,325,004 | Davidson | Dec. 16, 1919 |
| 1,387,558 | Rosheim | Aug. 16, 1921 |
| 2,274,186 | Brace | Feb. 24, 1942 |
| 2,278,447 | Hyde | Apr. 7, 1942 |
| 2,441,344 | Bosworth | May 11, 1948 |
| 2,453,914 | Hollenbeck | Nov. 16, 1948 |
| 2,457,756 | Vest | Dec. 28, 1948 |
| 2,490,193 | Barr | Dec. 6, 1949 |
| 2,507,867 | Pomes | May 16, 1950 |